(12) United States Patent
Wang et al.

(10) Patent No.: US 12,063,709 B2
(45) Date of Patent: Aug. 13, 2024

(54) GROUP MANAGEMENT METHOD, APPARATUS, AND SYSTEM

(71) Applicant: HUAWEI TECHNOLOGIES CO., LTD., Guangdong (CN)

(72) Inventors: Yuan Wang, Shanghai (CN); Runze Zhou, Shanghai (CN); Zhongping Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 17/519,741

(22) Filed: Nov. 5, 2021

(65) Prior Publication Data

US 2022/0060881 A1 Feb. 24, 2022

Related U.S. Application Data

(63) Continuation of application No. PCT/CN2020/088519, filed on Apr. 30, 2020.

(30) Foreign Application Priority Data

May 6, 2019 (CN) .......................... 201910372920.9

(51) Int. Cl.
*H04W 8/18* (2009.01)
*H04L 67/104* (2022.01)
(Continued)

(52) U.S. Cl.
CPC ......... *H04W 8/186* (2013.01); *H04L 67/1046* (2013.01); *H04W 8/20* (2013.01); *H04W 12/06* (2013.01)

(58) Field of Classification Search
CPC ...... H04W 8/186; H04W 8/20; H04L 67/1046
(Continued)

(56) References Cited

U.S. PATENT DOCUMENTS

| | | | | |
|---|---|---|---|---|
| 2011/0112905 | A1* | 5/2011 | Pulijala | ................. H04W 28/10 705/14.69 |
| 2016/0007138 | A1* | 1/2016 | Palanisamy | ............. H04W 4/08 455/41.2 |

(Continued)

FOREIGN PATENT DOCUMENTS

| | | | |
|---|---|---|---|
| CN | 104618349 A | | 5/2015 |
| CN | 105247813 A | | 1/2016 |

(Continued)

OTHER PUBLICATIONS

Ericsson, Huawei, "Group Identifier Translation," 3GPP TSG-CT WG4 Meeting #90, C4-191362, Xi'an, P.R. China, Apr. 8-12, 2019, 13 pages.

(Continued)

*Primary Examiner* — Ted M Wang
(74) *Attorney, Agent, or Firm* — Fish & Richardson P.C.

(57) ABSTRACT

This application provides an example group management method, apparatus, and system. The example group management method includes receiving a first group request from an application function network element, where the first group request includes indication information, an external group identifier, and first group information, and where the indication information indicates a group service type, and the external group identifier is a group identifier that is not identified by a network element by a network element inside a core network, in response to that the group service type is creating a group, obtaining an internal group identifier corresponding to the external group identifier, and associating the internal group identifier, the external group identifier, and the first group information, where internal group identifier is a group identifier that is identified by the network element inside the core network.

12 Claims, 10 Drawing Sheets

(51) Int. Cl.
*H04W 8/20* (2009.01)
*H04W 12/06* (2021.01)

(58) Field of Classification Search
USPC .......................................... 455/418
See application file for complete search history.

(56) References Cited

U.S. PATENT DOCUMENTS

| | | |
|---|---|---|
| 2016/0063076 A1 | 3/2016 | Martin, Jr. et al. |
| 2018/0270778 A1 | 9/2018 | Bharatia |
| 2018/0352050 A1 | 12/2018 | Li et al. |

FOREIGN PATENT DOCUMENTS

| | | | |
|---|---|---|---|
| CN | 106888437 A | 6/2017 | |
| CN | 108206986 A | 6/2018 | |
| CN | 109640275 A | 4/2019 | |

OTHER PUBLICATIONS

Office Action issued in Chinese Application No. 201910372920.9 on Mar. 15, 2021, 12 pages (with English translation).

PCT International Search Report and Written Opinion issued in International Application No. PCT/CN2020/088519 on Jul. 30, 2020, 17 pages (with English translation).

3GPP TR 29.890 V1.1.0 (Nov. 2017), "3rd Generation Partnership Project; Technical Specification Group Core Network and Terminals; Study on CT WG3 Aspects of 5G System—Phase 1; Stage 3 (Release 15)," Nov. 2017, 127 pages.

Extended European Search Report issued in European Application No. 20802287.1 on May 9, 2022, 7 pages.

Office Action issued in Chinese Application No. 201910372920.3 on Jan. 11, 2022, 4 pages.

* cited by examiner

GROUP MANAGEMENT METHOD, APPARATUS, AND SYSTEM

CROSS-REFERENCE TO RELATED APPLICATIONS

This application is a continuation of International Application No. PCT/CN2020/088519, filed on Apr. 30, 2020, which claims priority to Chinese Patent Application No. 201910372920.9, filed on May 6, 2019. The disclosures of the aforementioned applications are hereby incorporated by reference in their entireties.

TECHNICAL FIELD

This application relates to the field of communications technologies, and in particular, to a group management method, apparatus, and system.

BACKGROUND

Currently, a server (server)-client (client) communication mode may be used for an internet protocol (internet protocol, IP) service provided by the conventional 3rd generation partnership project (3rd generation partnership project, 3GPP). To be specific, mutual communication between clients is completed through proxy forwarding of a server. For example, in a process of using a WeChat application (application, APP), a terminal A sends a WeChat message to a terminal B through a 3GPP network. The message first reaches a WeChat application server outside the 3GPP network through the 3GPP network. For example, the message reaches a UPF via a base station, and then reaches the WeChat application server of an external DN via the UPF. Further, the WeChat application server processes the WeChat message, and sends the message to the terminal B through the 3GPP network, to complete communication between the terminal A and the terminal B.

With the development of communications technologies, a virtual local area network service (virtual local area network service, namely, virtual LAN service) is proposed in a 5th generation (5th generation, 5G) network, and the 3GPP network needs to provide a plurality of types of transmission services for a plurality of terminals in a group. The plurality of types of transmission services include a service that is based on the IP, the Ethernet (Ethernet), or another non-IP technology. To be specific, the virtual LAN service means that the communication between the terminal A and the terminal B is completed through the 3GPP network and usually does not need deployment and participation of an external application server. For example, after a virtual LAN service technology is used, a route between the terminal A and the terminal B may be: the terminal A-a base station of the terminal A-the UPF-a base station of the terminal B-the terminal B. It can be learned that compared with a conventional technology, the message between the terminal A and the terminal B may not pass through the external application server.

Currently, no corresponding solution is provided for UE to establish and manage a session of the virtual LAN service when the virtual LAN service technology is used.

SUMMARY

Embodiments of this application provide a group management method, apparatus, and system, so that a group can be dynamically created in a process of using a virtual LAN service technology.

To achieve the foregoing objectives, the following technical solutions are used in the embodiments of this application.

According to a first aspect, an embodiment of this application provides a group management method. The method is performed by a data network element (which, for example, may be UDM shown in FIG. 1) or a component (for example, a chip system) in a data network element. The method includes:

receiving a first group request from an application function network element, where the first group request includes indication information, an external group identifier, and first group information, and the indication information is used to indicate a group service type; if the group service type is creating a group, obtaining an internal group identifier corresponding to the external group identifier; and associating the internal group identifier, the external group identifier, and the first group information. The external group identifier is a group identifier that cannot be identified by a network element by a network element inside a core network. The internal group identifier is a group identifier that can be identified by a network element inside the core network.

According to the group management method provided in this embodiment of this application, the first group request may be received from the application function network element. The first group request carries the indication information used to indicate the group service type, the first group information, and the external group identifier. In this way, when the application function network element requests to create the group, the data network element can obtain, based on the first group request, the internal group identifier corresponding to the external group identifier, and associate the internal group identifier, the external group identifier, and the first group information. On the one hand, an operation of creating a group at an application layer by a user is random. According to the group management method provided in this embodiment of this application, the first group information, the external group identifier, and the internal group identifier may be dynamically associated for a dynamic requirement of creating the group. This means that the AF can have a capability of dynamically creating the group. On the other hand, because the group created at the application layer by the user may be indicated by using the internal group identifier that can be identified by a 3GPP network element, the 3GPP network element can subsequently distinguish between different groups based on the internal group identifier, so that the different groups can be correspondingly managed.

In a possible design, the data network element may further perform the following step: sending the internal group identifier and the first group information to one or more group members.

In a possible implementation, the data network element sends a newly allocated internal group identifier to an interface network element.

In a possible implementation, the data network element sends a URSP to the one or more group members in a URSP update procedure, where the URSP includes the internal group identifier and the first group information (for example, a DNN and S-NSSAI), to update a URSP of a group member.

In this way, when data reaches a terminal, the terminal may send a PDU session establishment request to a network device (for example, an AMF), where the PDU session establishment request carries a DNN of a group in which the terminal is located, so that the network device (for example, the AMF) identifies, by using the DNN, a specific group in which the terminal is located.

According to a second aspect, this application provides a group management method. The method is performed by a data network element or a component (for example, a chip system) in a data network element. The method includes:

receiving a second group request from an interface network element, where the second group request includes an external group identifier and first group information, and the external group identifier is a group identifier that cannot be identified by a network element inside a core network; obtaining an internal group identifier corresponding to the external group identifier; and associating the internal group identifier, the external group identifier, and the first group information. The internal group identifier is a group identifier that can be identified by a network element inside the core network.

Compared with the designs of the first aspect, the second group request does not carry indication information used to indicate a group service type, so that signaling overheads of interaction between the interface network element and the data network element can be reduced. In addition, UDM can also be dynamically triggered to obtain the internal group identifier corresponding to the external group identifier.

In a possible design, the obtaining an internal group identifier corresponding to the external group identifier includes:

determining whether an entry of the internal group identifier corresponding to the external group identifier has been stored; and if determining that the entry of the internal group identifier corresponding to the external group identifier is not stored, obtaining the internal group identifier corresponding to the external group identifier.

It is easy to understand that, usually, if the UDM does not store the internal group identifier corresponding to the external group identifier, it indicates that an AF sends, to the UDM, a request for newly creating a group, and the newly created group is not recorded in the UDM. In this case, the UDM needs to allocate a new internal group identifier to the newly created group, so that the core network subsequently manages the newly created group based on the internal group identifier.

Group management mentioned in this application includes but is not limited to adding a group member, deleting a group member, and group member permission management.

In a possible design, the data network element may further perform the following step:

sending the external group identifier and the newly allocated internal group identifier to the interface network element, to indicate the interface network element to store the internal group identifier.

For example, an NEF already stores an internal group identifier and an external group identifier of a group 1 and an internal group identifier and an external group identifier of a group 2. After the UDM delivers a newly allocated internal group identifier and an external group identifier of a group 3 to the NEF, the NEF stores the internal group identifiers and the external group identifiers of the three groups. In this way, because the NEF stores internal group identifiers and external group identifiers of one or more groups, subsequently, when the NEF receives an external group identifier from the AF, the NEF may determine whether an internal group identifier corresponding to the external group identifier has been stored. If the NEF does not store the internal group identifier corresponding to the external group identifier, the NEF requests the UDM to allocate the internal group identifier to the newly created group.

In a possible design, the data network element may further perform the following step: sending the internal group identifier and the first group information to one or more group members.

According to a third aspect, an embodiment of this application provides a group management method. The method is performed by an interface network element (for example, the interface network element may be an NEF shown in FIG. 1) or a component (for example, a chip system) in an interface network element. The method includes:

receiving a third group request from an application function network element, where the third group request includes an external group identifier and first group information, and the external group identifier is a group identifier that cannot be identified by a network element inside a core network; determining whether an entry of an internal group identifier corresponding to the external group identifier has been stored; and if the entry of the internal group identifier corresponding to the external group identifier is not stored, sending a second group request to a data network element, where the second group request includes the external group identifier and first identifiers of one or more group members. The internal group identifier is a group identifier that can be identified by a network element inside the core network.

According to a fourth aspect, an embodiment of this application provides a group management apparatus. The apparatus may be a data network element (which, for example, may be UDM shown in FIG. 1) or a component (for example, a chip system) in a data network element. The apparatus includes:

a communications interface, configured to receive a first group request from an application
function network element, where the first group request includes indication information, an external group identifier, and first group information, the indication information is used to indicate a group service type, and the external group identifier is a group identifier that cannot be identified by a network element by a network element inside a core network; and a processor, configured to: if the group service type is creating a group, obtain an internal group identifier corresponding to the external group identifier, where the internal group identifier is a group identifier that can be identified by a network element inside the core network; and associate the internal group identifier, the external group identifier, and the first group information.

In a possible implementation, the communications interface is further configured to send a newly allocated internal group identifier to an interface network element.

In a possible design, the communications interface is further configured to send the internal group identifier and the first group information to one or more group members.

According to a fifth aspect, this application provides a group management apparatus. The apparatus is a data network element (which, for example, may be UDM shown in FIG. 1) or a component (for example, a chip system) in a data network element. The apparatus includes:

a communications interface, configured to receive a second group request from an interface network element, where the second group request includes an external group identifier and first group information, and the external group identifier is a group identifier that cannot be identified by a network element inside a core network; and a processor, configured to: obtain an internal group identifier corresponding to the external group identifier, where the internal group identifier is a group identifier that can be identified by a network element inside the core network; and associate the internal group identifier, the external group identifier, and the first group information.

In a possible design, that the processor is configured to obtain an internal group identifier corresponding to the external group identifier includes: the processor is configured to: determine whether an entry of the internal group identifier corresponding to the external group identifier has been stored; and if determining that the entry of the internal group identifier corresponding to the external group identifier is not stored, obtain the internal group identifier corresponding to the external group identifier.

In a possible design, the communications interface is further configured to send the internal group identifier to the interface network element, to indicate the interface network element to store the internal group identifier.

In a possible design, the communications interface is further configured to send the internal group identifier and the first group information to one or more group members.

According to a sixth aspect, an embodiment of this application provides a group management apparatus. The apparatus may be a data network element (which, for example, may be an NEF shown in FIG. 1) or a component (for example, a chip system) in a data network element. The apparatus includes:

a communications interface, configured to receive a third group request from an application function network element, where the third group request includes an external group identifier and first group information, and the external group identifier is a group identifier that cannot be identified by a network element inside a core network; and a processor, configured to determine whether an entry of an internal group identifier corresponding to the external group identifier has been stored, where the internal group identifier is a group identifier that can be identified by a network element inside the core network, where the communications interface is further configured to: if the entry of the internal group identifier corresponding to the external group identifier is not stored, send a second group request to the data network element, where the second group request includes the external group identifier and first identifiers of one or more group members.

In a possible design of the foregoing aspects, the first group information includes at least one of the following information: a data network identifier of a group, slice information of a group, a session type corresponding to a group, or first identifiers of one or more group members included in a group.

According to a seventh aspect, this application provides a group management apparatus, configured to implement a function of the data network element according to any one of the foregoing aspects, or configured to implement a function of the interface network element according to any one of the foregoing aspects.

According to an eighth aspect, this application provides a group management apparatus. The apparatus has a function of implementing the group management method according to any one of the foregoing aspects. The function may be implemented by hardware, or may be implemented by hardware executing corresponding software. The hardware or the software includes one or more modules corresponding to the function.

According to a ninth aspect, a group management apparatus is provided, including a processor and a memory. The memory is configured to store a computer-executable instruction. When the group management apparatus runs, the processor executes the computer-executable instruction stored in the memory, so that the group management apparatus performs the group management method according to any one of the foregoing aspects.

According to a tenth aspect, a group management apparatus is provided, including a processor. The processor is configured to: after being coupled to a memory and reading an instruction in the memory, perform the group management method according to any one of the foregoing aspects based on the instruction.

According to an eleventh aspect, an embodiment of this application provides a group management apparatus. The apparatus may be a chip system. The chip system includes a processor, and may further include a memory. The chip system is configured to implement a function of the method according to any one of the foregoing aspects. The chip system may include a chip, or may include a chip and another discrete component.

According to a twelfth aspect, a group management apparatus is provided. The apparatus may be a circuit system, the circuit system includes a processing circuit, and the processing circuit is configured to perform the group management method according to any one of the foregoing aspects.

According to a thirteenth aspect, an embodiment of this application further provides a computer-readable storage medium, including an instruction. When the instruction is run on a computer, the computer is enabled to perform the method according to any one of the foregoing aspects.

According to a fourteenth aspect, an embodiment of this application further provides a computer program product, including an instruction. When the computer program product runs on a computer, the computer is enabled to perform the method according to any one of the foregoing aspects.

According to a fifteenth aspect, an embodiment of this application provides a system. The system includes a data network element that performs the group management method according to any one of the first aspect and the possible designs of the first aspect and an interface network element that performs the group management method according to any one of the third aspect and the possible designs of the third aspect. Alternatively, the system includes a data network element that performs the group management method according to any one of the second aspect and the possible designs of the second aspect and an interface network element that performs the group management method according to any one of the third aspect and the possible designs of the third aspect. Optionally, the system further includes an application function network element (which, for example, may be an AF shown in FIG. 1). The application function network element is configured to: receive a group request from a terminal, for example, receive, from the terminal, a request for newly creating a group; and send a group request to the data network element, to trigger the data network element to allocate an internal group identifier to the newly created group.

DESCRIPTION OF EMBODIMENTS

Figure 1:
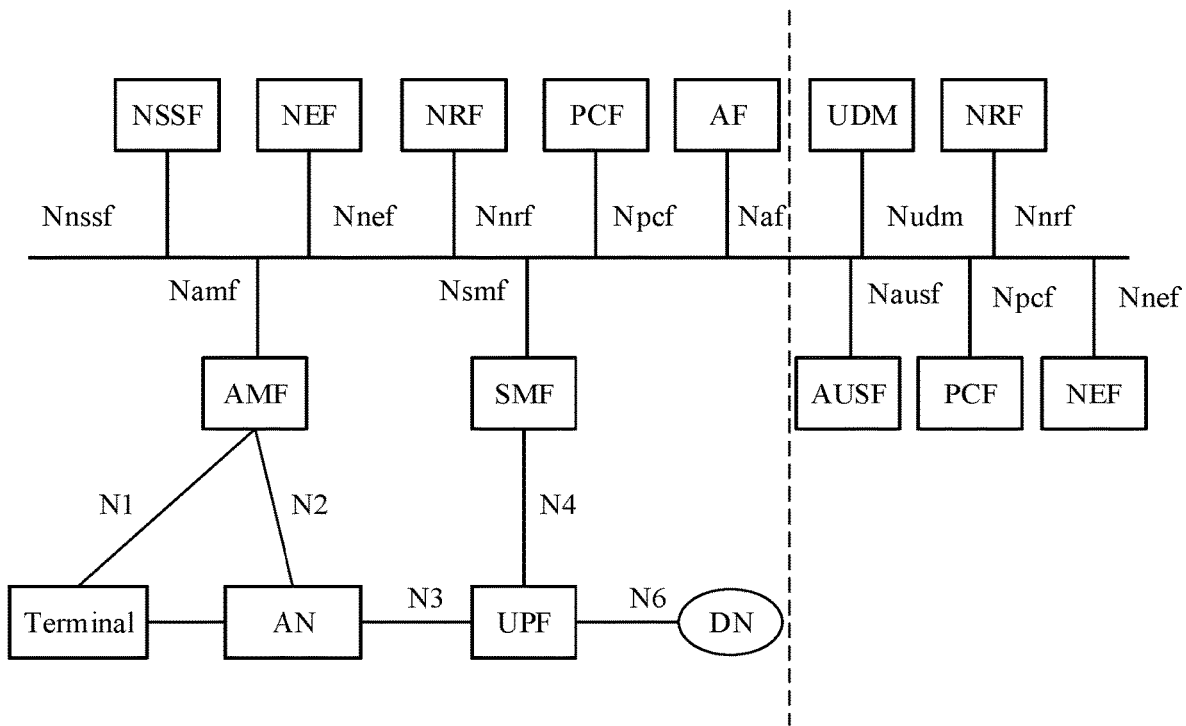
FIG. 1 is a schematic architectural diagram of a communications system according to an embodiment of this application.

In the specification and the accompanying drawings of this application, the terms "first", "second", and the like are intended to distinguish between different objects or distinguish between different processing of a same object, but do not indicate a particular order of the objects. In addition, the terms "including", "contain", or any other variants thereof mentioned in descriptions of this application, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "example" or the like is intended to present a relative concept in a specific manner.

First, technical terms designed in the embodiments of this application are described.

1. External group identifier (external group ID): After a terminal dynamically creates a group at an application layer, an application server allocates a dynamic group identifier to the group at the application layer. A group identifier allocated by a WeChat application server may be referred to as an external group identifier. For example, users of a terminal 1 to a terminal 6 create a WeChat group "Academic discussion group". After detecting an operation of creating the WeChat group by the users, the WeChat application server may allocate an application-layer group identifier to the WeChat group, where the external group identifier is used to uniquely identify the WeChat group at the application layer.

2. Internal group identifier (internal group ID): In a 3GPP network, a network device usually cannot directly identify an external group identifier, and cannot understand a meaning of the identifier. Consequently, the network device cannot distinguish between different groups, and cannot manage a corresponding group and provide a subsequent LAN service (LAN type service). To enable the 3GPP network to identify different groups, an AF may send a group request to a 3GPP network element. In this way, the 3GPP network element may generate an internal group identifier of a group based on the group request. The internal group identifier is a group identifier that can be identified by a 3GPP core network element. In this way, the 3GPP network element may perform group management and the like by using the internal group identifier. For example, the group management may be adding a group member to the group or deleting a group member from the group.

3. Single group management assistance information (Single network slice selection assistance information, S-NSSAI) is used to uniquely indicate a network slice, and an information element (information-element) of the S-NSSAI is shown in the following Table 1:

TABLE 1

| 8 | 7 | 6 | 5 | 4 | 3 | 2 | 1 | |
|---|---|---|---|---|---|---|---|---|
| S-NSSAI IEI | | | | | | | | octet 1 |
| Length of S-NSSAI contents | | | | | | | | octet 2 |
| SST | | | | | | | | octet 3 |
| SD | | | | | | | | octet 4* |
| | | | | | | | | octet 6* |
| Mapped configured SST | | | | | | | | octet 7* |
| Mapped configured SD | | | | | | | | octet 8* |
| | | | | | | | | octet 10* |

In an information element of the S-NSSAI, S-NSSAI IE1 (information-element identifier, IEI) indicates an identifier of the information element.

Length of S-NSSAI contents indicates the length of the information element (which may be in a unit of bytes).

SST is used to indicate a specific network service that can be provided by a slice. The network service includes but is not limited to an eMBB service, a URLLC service, and an mMTC service.

Optionally, the length of the SST is one byte. Certainly, as a protocol evolves, the length of the SST may change. The SST includes a standardized type (namely, a standard SST value (value)) and an operator-defined type (namely, a non-standard SST value). With reference to the following Table 2, currently, only content about SST values of 1 to 3 is defined in the protocol.

TABLE 2

| Slice/Service type | SST value | Characteristics. |
|---|---|---|
| eMBB | 1 | Slice suitable for the handling of 5G enhanced Mobile Broadband. |
| URLCC | 2 | Slice suitable for the handling of ultra-reliable low latency communications. |
| MIoT | 3 | Slice suitable for the handling of massive IoT. |

In the embodiments of this application, SSTs of two slices are the same, indicating that service types indicated by the SSTs of the two slices are the same, in other words, SST values are the same. For example, if an SST of a slice 1 is eMBB (an SST value is 1), and an SST of a slice 2 is also eMBB (an SST value is 1), the SSTs of the slice 1 and the slice 2 are the same.

A group management method provided in the embodiments of this application is applied to a communications system that uses a virtual LAN service technology. FIG. 1 is an example architecture of a communications system to which embodiments of this application are applicable. The communications system includes an operation, administration and maintenance (operation administration management, OAM) network element, a group management function (network slice selection function, NSSF), a network exposure function (network exposure function, NEF), a network repository function (network repository function, NRF), a policy control function (policy control function, PCF), an application function (application function, AF), unified data management (unified data management, UDM), an authentication server function (authentication server function, AUSF), an access and mobility management function (access and mobility management function, AMF), a session management function (session management function, SMF), and an access network (access network, AN) network element. An AN includes a wired access network, a radio access network (radio access network, RAN), network elements or devices such as a user plane function (user plane function, UPF) network element and a data network (data network, DN) network element, and a terminal.

The terminal accesses the AN in a wireless or wired manner. The wireless manner may be, for example, accessing the AN through wireless fidelity (wireless-fidelity, WiFi), or may be accessing the AN through a cellular network (for example, E-UTRA or NR). The terminal communicates with the AMF through N1. The AN communicates with the UPF through N3, and the AN communicates with the AMF through N2. The UPF communicates with the SMF through N4, and the UPF communicates with the DN network element through N6. The SMF communicates with the AMF through N11 (not shown in FIG. 1), the SMF communicates with the UDM through N10 (not shown in FIG. 1), and the SMF communicates with the PCF through N7 (not shown in FIG. 1). The AMF communicates with the AUSF through N12 (not shown in FIG. 1), and the AUSF communicates with the UDM through N13 (not shown in FIG. 1). The AF communicates with the PCF through N5 (not shown in FIG. 1).

It may be understood that based on a requirement for deploying a 5G system, the foregoing network elements may communicate with each other in a specific manner (for example, the terminal communicates with the AMF through N1). Only communication modes between some network elements are listed above. For brevity, a communication mode between other network elements is not described in detail in the embodiments of this application.

Optionally, the terminal in the embodiments of this application may include various handheld devices, wearable devices, or computing devices that have a communication function, or another processing device connected to a modem, and may further include a personal digital assistant (personal digital assistant, PDA) computer, a tablet computer, a laptop computer (laptop computer), a machine type communication (machine type communication, MTC) terminal, user equipment (user equipment, UE), and the like. Certainly, when the terminal is mentioned, the terminal may alternatively be, for example, a chip system in UE. An implementation form of the terminal is not limited in the embodiments of this application.

Optionally, names of network elements in FIG. 1 and names of interfaces between the network elements are merely examples. In specific implementation, the names of the network elements or the names of the interfaces between the network elements may be other names, or the network elements may be referred to as entities. This is not specifically limited in the embodiments of this application. All or a part of the network elements in FIG. 1 may be physical entity network elements, or may be virtualized network elements. This is not limited herein.

In the embodiments of this application, that a network element (for example, a network element A) obtains information from another network element (for example, a network element B) may mean that the network element A directly receives the information from the network element B, or may mean that the network element A receives the information from the network element B via another network element (for example, a network element C). When the network element A receives the information from the network element B via the network element C, the network element C may transparently transmit the information, or may process the information, for example, transmit different messages including the information or filter the information, and send only filtered information to the network element A. Similarly, in the embodiments of this application, that the network element A sends information to the network element B may mean that the network element A directly sends the information to the network element B, or may mean that the network element A sends the information to the network element B via another network element (for example, the network element C).

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that with the evolution of the network architecture and the emergence of new service scenarios, the technical solutions provided in the embodiments of this application are also applicable to similar technical problems.

Figure 2:
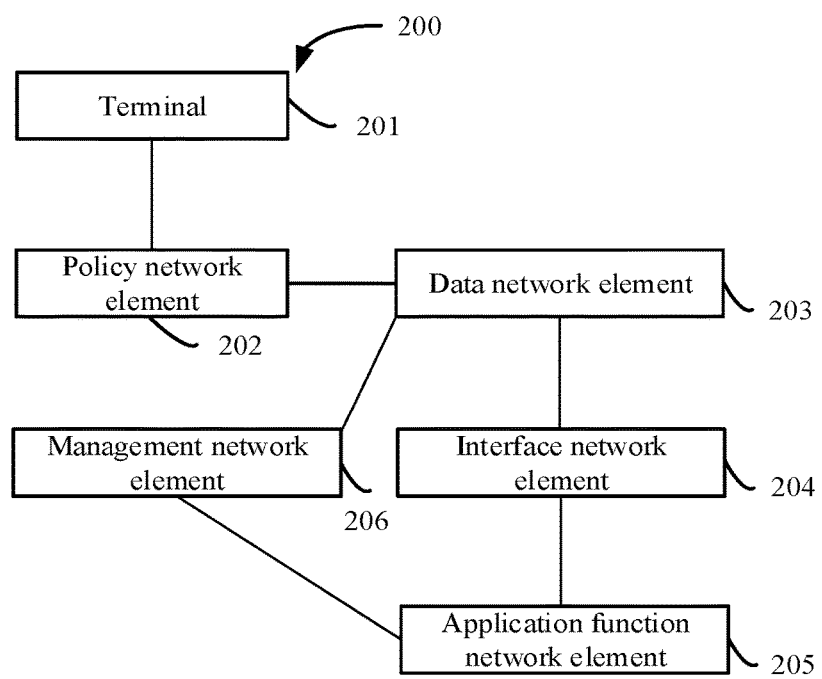
FIG. 2 is a schematic architectural diagram of a group management system according to an embodiment of this application.

An embodiment of this application provides a group management system. With reference to FIG. 2, the system 200 includes a data network element 203 and an interface network element 204.

The interface network element 204 is configured to provide an interface (interface) for interaction between an external application function network element 205 and the data network element 203. Specifically, the interface network element 204 may be configured to: receive a group request from the application function network element 205, and send the group request to the data network element 203.

The data network element 203 is configured to: receive a group request from the application function network element 205, and allocate an internal group identifier to a newly created group based on the group request, so that a 3GPP network element can subsequently distinguish between different groups based on the identifiable internal group identifier and perform group-related management. The data network element 203 is further configured to send a notification message to a policy network element 202, to indicate the policy network element 202 to update a URSP.

The URSP is used to distinguish between the different groups. Different URSP rules are allocated to a terminal 201 in the different groups. The terminal 201 may determine, based on a URSP rule, a group in which the terminal 201 is located.

In a possible implementation, the group management system further includes the terminal 201, the application function network element 205, a management network element 206, and the policy network element 202.

The application function network element 205 is configured to: in a process in which the terminal 201 dynamically creates a group at an application layer, detect an operation of creating the group by the terminal 201, for example, receive a group request from the terminal 201. The application function network element 205 is further configured to allocate an external group identifier, namely, an external group ID, to each newly created group based on the group request; is further configured to send the group request to the interface network element 204, to request to create the new group; and is further configured to send a subscription request to the management network element 206, to request to register and subscribe to a virtual LAN service (the virtual LAN service may also be referred to as a LAN service in this specification).

The management network element 206 is configured to: receive the subscription request from the application function network element 205, and allocate, to the application function network element 205 based on the subscription request, information such as a DNN/S-NSSAI used to create a LAN group.

The policy network element 202 is configured to: update the URSP based on the notification message from the data network element 203, and deliver an updated URSP to the terminal 201 corresponding to the LAN group.

The terminal 201 is configured to receive the URSP delivered by the policy network element 202. When an APP on the terminal 201 triggers a LAN service, for example, a WeChat application on a terminal of a user in a WeChat group sends a WeChat message to another terminal in the WeChat group, the terminal can find, based on a URSP, information such as a DNN/S-NSSAI corresponding to the LAN service (namely, a WeChat message service), and report the information such as the DNN/the S-NSSAI when establishing a PDU session, so that a 3GPP network can identify, based on the information such as the DNN/the S-NSSAI, a specific LAN group to which the terminal belongs.

The application function network element in FIG. 2 may be the AF in FIG. 1, the interface network element may be the NEF in FIG. 1, the data network element may be the UDM in FIG. 1, the management network element may be the OAM in FIG. 1, and the policy network element may be the PCF in FIG. 1. In addition, for a connection relationship between the network elements shown in FIG. 2, refer to a connection relationship between the corresponding network elements in FIG. 1. Details are not described herein again.

An example in which the embodiments of this application are applied to the system shown in FIG. 1, to be specific, the application function network element is the AF shown in FIG. 1, the interface network element is the NEF shown in FIG. 1, the data network element is the UDM shown in FIG. 1, the policy network element is the PCF shown in FIG. 1, and the management network element is the OAM shown in FIG. 1 is used to describe the technical solutions in the embodiments of this application.

First, a procedure in which the AF applies to the OAM for a LAN service is described. The procedure is a basis of a group management method in the embodiments of this application. To be specific, the AF can obtain permission to use the LAN service only after being authorized by the OAM. For example, the AF can obtain permission to dynamically create a group. Specifically, with reference to FIG. 3, the procedure in which the AF applies to the OAM for the LAN service includes the following steps.

S301: The AF sends a subscription request (which, for example, may be a 5G-LAN service request) to the OAM.

Correspondingly, the OAM receives the subscription request from the AF network element.

The subscription request is used to request to subscribe to the LAN service.

The subscription request includes an identifier (APP ID) of an application supported by the AF. For example, if the AF is a WeChat application server, the subscription request includes an identifier of a WeChat application supported by the WeChat application server.

S302: The OAM determines, based on the application supported by the AF, first configuration information (LAN configuration data) corresponding to the AF.

In a possible implementation, the first configuration information is used to indicate a subscription configuration of a group.

The OAM may configure first configuration information of one or more groups for the AF. The first configuration information includes data network identifiers respectively corresponding to the one or more groups. A data network identifier may be, for example, a DNN or other information used to identify a data network. Different groups correspond to different data network identifiers. In this way, the data network identifier may uniquely identify one group. Subsequently, when data reaches a terminal, the terminal may send a PDU session establishment request to a network device (for example, the AMF), where the PDU session establishment request carries a DNN of a group in which the terminal is located, so that the network device (for example, the AMF) identifies a specific group in which the terminal is located.

Optionally, the first configuration information further includes at least one of the following information: slice information respectively corresponding to the one or more groups or session types respectively corresponding to the one or more groups.

The slice information of the group may be, for example, single group management assistance information (single network slice selection assistance information, S-NSSAI). In the embodiments of this application, the group is usually created based on a service type. In other words, service types of terminals in a same group are usually the same. Based on this, service types (for example, SSTs) of S-NSSAI of all terminals in the same group are usually the same. For example, in a game APP, a user creates a group 1 by using the APP on a terminal, a terminal service in the group 1 requires high reliability and a low latency, and an SST of S-NSSAI corresponding to each terminal in the group 1 may be URLLC. In the game APP, the user creates a group 2. A relatively high bandwidth is required for a terminal in the group 2 to transmit a service, and an SST of S-NSSAI corresponding to each terminal in the group 2 may be eMBB.

Each PDU session (session) supports one session type, and the session type includes but is not limited to one of IPv4, IPv6, IPv4v6, the Ethernet, or Unstructured. The group is usually created based on an APP type and the service type. For terminals in a group created by using a same type of APP (for example, WeChat), when the terminals transmit a same type of service, session types of the terminals may be the same. For example, for a WeChat group created by using a WeChat application, when terminals in the WeChat group transmit a same type of service, for example, receive/send a WeChat text message, session types of the terminals may be the same. As described above, the service types of the terminals in the same group are usually the same. Therefore, the session types of the terminals in the same group are also usually the same.

For example, for a WeChat group 1 and a WeChat group 2 in the AF, first configuration information allocated by the OAM is: {WeChat group 1: a DNN 1 is used to identify the WeChat group 1, a service type of a terminal slice in the WeChat group 1 is eMBB, and a session type of a terminal in the WeChat group 1 is an Ethernet type; and WeChat group 2: a DNN 2 is used to identify the WeChat group 2, a service type of a terminal slice in the WeChat group 2 is URLLC, and a session type of a terminal in the WeChat group 2 is an Ethernet type}.

A specific quantity of groups whose first configuration information is configured by the OAM for the AF is related to a subscription condition of the AF. For example, the subscription condition may be but is not limited to a subscription tariff. When the subscription tariff of the AF is relatively high, the OAM may configure first configuration information of more groups for the AF. For example, the OAM may configure first configuration information of 1000 groups for the AF when the AF requests to subscribe to the LAN service. In this way, the AF can obtain, by requesting the LAN service only once, the first configuration information respectively corresponding to the 1000 groups, so that the AF has a capability of creating the 1000 groups. When the subscription tariff of the AF is relatively low, the OAM configures first configuration information of fewer groups (for example, 10 groups) for the AF. In this way, the AF has, by requesting the LAN service once, a capability of creating the 10 groups. If the user needs to create the $11^{th}$ group at an application layer, the AF may send a subscription request to the OAM, to request new first configuration information. In this case, the OAM may configure only the first configuration information of the $11^{th}$ group, or may configure first configuration information of a plurality of groups (for example, configure the $11^{th}$ group to the $100^{th}$ group).

S303: The OAM sends a subscription response to the AF.

Correspondingly, the AF receives the subscription response from the OAM.

The subscription response includes the first configuration information respectively corresponding to the one or more groups.

Figure 3:
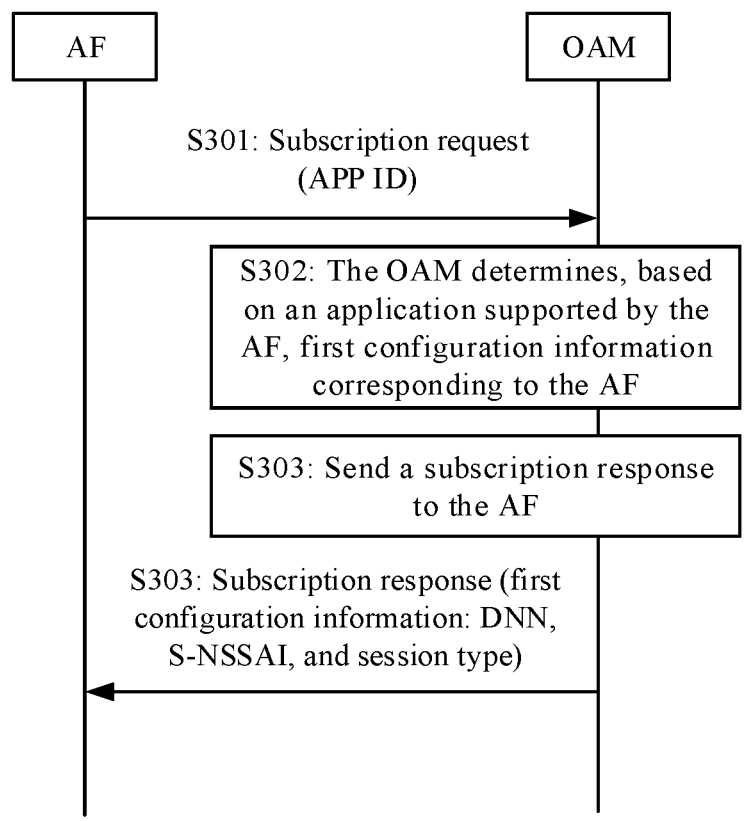
FIG. 3 is a schematic flowchart of a subscription method according to an embodiment of this application.

In the subscription method shown in FIG. 3, the external AF can dynamically subscribe to the LAN service from the OAM of an operator based on a requirement of the external AF, and further obtain the first configuration information such as the DNN and the S-NSSAI from the OAM, so that the AF can dynamically create a LAN group subsequently based on the obtained first configuration information. To be specific, the AF can dynamically allocate an external group identifier to a newly created group, and a core network side can dynamically allocate an internal group identifier to the newly created group.

Figure 4:
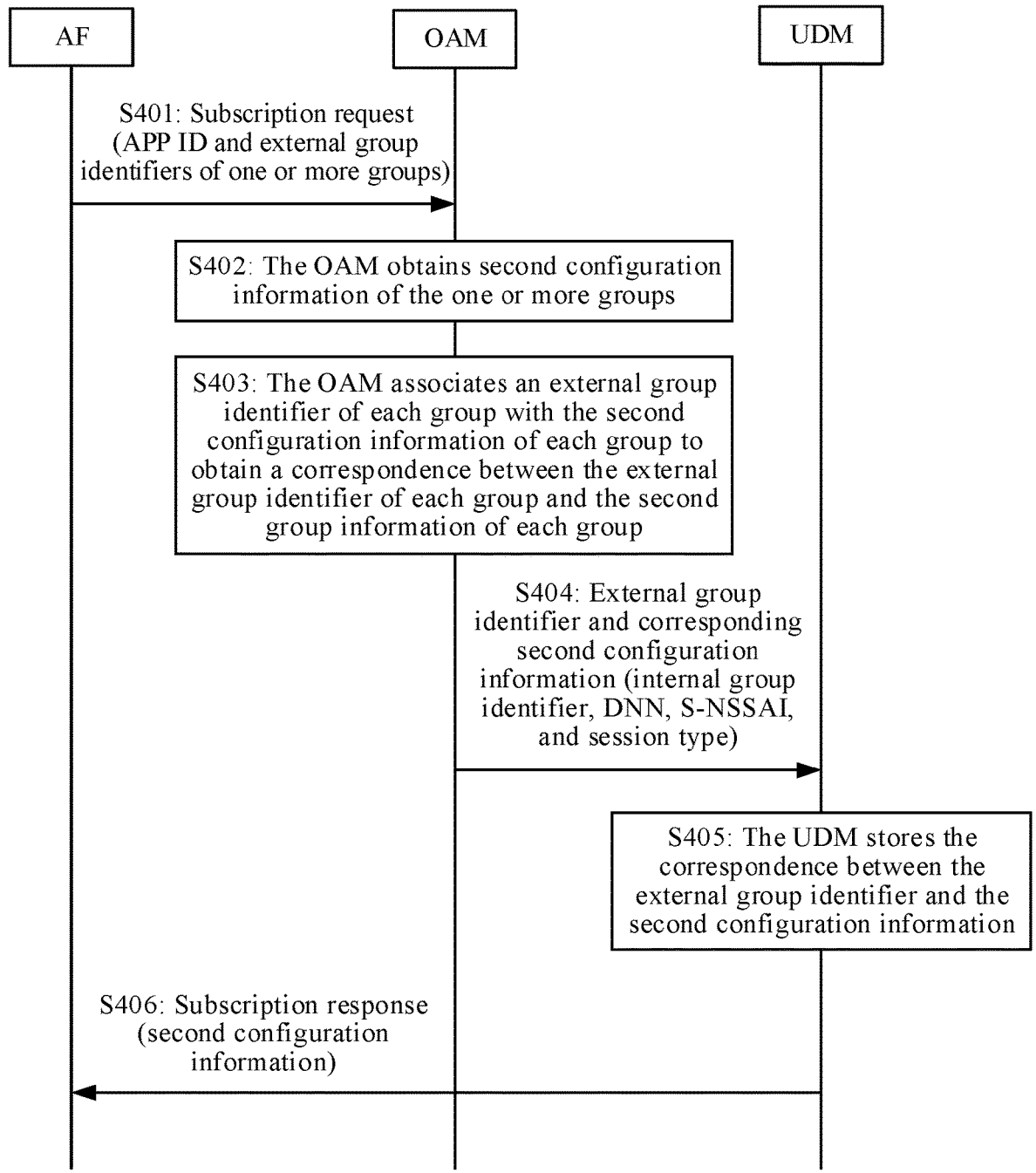
FIG. 4 is a schematic flowchart of a subscription method according to an embodiment of this application.

In some embodiments, with reference to FIG. 4, that the AF applies to the OAM for the LAN service may alternatively be specifically implemented by using the following steps.

S401: The AF sends a subscription request to the OAM.

Correspondingly, the OAM receives the subscription request from the AF network element.

The subscription request is used to request to subscribe to and register the LAN service, that is, request a core network to allocate second configuration information. For a detailed description of the second configuration information, refer to the following.

The subscription request includes an identifier of an application supported by the AF, and external group identifiers that are of one or more groups and that are allocated by the AF.

An example in which the AF is a WeChat application server is used. The WeChat application server expects to subscribe to a LAN service of 100 groups. In other words, the AF expects to have a capability of creating the 100 groups. In this case, the WeChat application server may send a subscription request to the OAM. The subscription request carries a WeChat application identifier and 100 external group identifiers dynamically pre-allocated by the WeChat application server (for example, external group identifiers respectively pre-allocated by the WeChat application server to groups 1 to 100).

In a possible implementation, the subscription request may be, for example, a 5G-LAN service request.

S402: The OAM obtains second configuration information of the one or more groups based on the external group identifiers of the one or more groups.

The second configuration information is used to indicate a subscription configuration of a group.

For a group, second configuration information of the group includes an internal group identifier of the group and a data network identifier of the single group.

Optionally, the second configuration information of the single group further includes at least one of the following information: slice information of the single group or a session type corresponding to the single group.

The OAM may allocate, based on a preset policy, the second configuration information respectively corresponding to the one or more groups to the AF, or the OAM may send the foregoing one or more external group identifiers and the APP ID to another network element, to calculate, by using a computing capability of the another network element, the second configuration information respectively corresponding to the one or more groups. In other words, the another network element allocates the corresponding second configuration information to the one or more groups. This is not limited in the embodiments of this application.

S403: The OAM associates an external group identifier of each group with the second configuration information of each group to obtain a correspondence between the external group identifier of each group and the second configuration information.

In a possible implementation, the OAM may further associate the external group identifier, the second configuration information, and the APP ID corresponding to the group.

To be specific, for each group, the OAM associates the external group identifier of the group with the second configuration information of the group (optionally, the APP ID of the group may also be associated).

S404: The OAM sends the external group identifier and the corresponding second configuration information (optionally, further sends the APP ID corresponding to the group) to the UDM.

S405: The UDM stores the correspondence between the external group identifier and the second configuration information.

In a possible implementation, the UDM stores the correspondence in a unified data repository (Unified Data Repository, UDR).

Optionally, the UDM stores a correspondence among the external group identifier, the second configuration information, and the APP ID of each group.

In this way, when the AF subsequently triggers a 5G LAN service (for example, creates a 5G LAN group) to a network side, the AF provides an external group identifier for the UDM, and the UDM may search, based on the correspondence stored in the UDR, for an internal group identifier corresponding to the external group identifier, so that the network side performs group management and the like by using the internal group identifier.

S406: The OAM sends a subscription response to the AF.

The subscription response includes the second configuration information, and is used to indicate subscription configurations of the one or more groups.

In this embodiment of this application, an execution occasion of S406 is not limited. In addition to the execution occasion shown in FIG. 4, S406 may be directly performed after the second configuration information is obtained in S402. Alternatively, S406 may be performed after S403. Alternatively, S406 is performed on another occasion.

In the subscription method shown in FIG. 4, the OAM can dynamically allocate the second configuration information to the AF based on the external group identifier provided by the AF, associate the external group identifier with the second configuration information, and store the association in the UDM. In this way, subsequently, when the AF triggers the LAN service to the network side, the AF sends the external group identifier to the UDM, and the UDM searches for the internal group identifier based on the stored correspondence. If the corresponding internal group identifier can be found, the internal group identifier is directly used to perform the group management and the like; or if the internal group identifier corresponding to the group cannot be found, the corresponding internal group identifier is generated for the core network to subsequently use for the LAN service. Compared with the prior art in which the AF is not supported in dynamically creating the group, to be specific, both the external group identifier and a network side group identifier are preconfigured in the core network and the AF, in the method provided in this embodiment of this application, the AF can dynamically allocate the external group identifier, and a core network side can also dynamically allocate the network side group identifier. In other words, the AF is supported in dynamically creating the group.

An embodiment of this application further provides a group management method. Based on the subscription procedure shown in FIG. 3 or FIG. 4, with reference to FIG. 5, the group dynamic-management method includes the following steps.

S501: An AF sends a first group request to an NEF.

Correspondingly, the NEF receives the first group request from the AF.

The first group request includes indication (indication) information and an external group identifier (External Group ID). The external group identifier is a group identifier that cannot be identified by a network element by a network element inside a core network. The indication information is used to indicate a group service type. The group service type includes but is not limited to creating a group, updating a group parameter, deleting a group member, adding a group member, and managing permission of a group member.

Optionally, the first group request further includes first group information, and the first group information includes at least one of the following information: a data network identifier of the group, slice information of the group, a session type corresponding to the group, first identifiers of one or more group members included in the group, or an application identifier corresponding to the group.

A first identifier includes but is not limited to a generic public subscription identifier (general public subscriber identity, GPSI). Each terminal corresponds to one GPSI.

S502: The NEF sends an authentication request to UDM.

Correspondingly, the UDM receives the authentication request from the NEF.

The authentication request is used to query whether the AF has subscribed to a LAN service, that is, to authenticate the AF.

S502 is an optional step.

S503: The UDM sends an authentication response to the NEF.

Correspondingly, the NEF receives the authentication response from the UDM.

The authentication response is used to indicate whether the AF has subscribed to the LAN service. In a possible implementation, the UDM determines whether the AF has subscribed to the LAN service, and feeds back an authentication response to the NEF. The authentication response indicates that the AF has subscribed to the LAN service, or the AF does not subscribe to the LAN service. In another possible implementation, the UDM does not directly indicate whether the AF has subscribed to the LAN service, but feeds back an authentication response to the NEF. The authentication response includes subscription information of the AF. In this way, the NEF may determine, based on the subscription information of the AF, whether the AF has subscribed to the LAN service.

S503 is an optional step.

S504: The NEF sends a second group request to the UDM.

Correspondingly, the UDM receives the second group request from the NEF.

In a possible implementation, the NEF invokes an Nudm_Parameter Provision xxx request service of the UDM to send a second group request to the UDM. For example, when the group service type is creating the group, the NEF invokes an Nudm_Parameter Provision update request service of the UDM to send the second group request to the UDM. For example, when the group service type is deleting the group member, the NEF invokes an Nudm_Parameter Provision delete request service of the UDM to send the second group request to the UDM.

S505: If the group service type is creating the group, the UDM obtains an internal group identifier corresponding to the external group identifier.

It is easy to understand that, when the group service type is creating the group, it indicates that the AF has detected an operation of newly creating a group at an application layer by a user. In this case, the UDM needs to dynamically allocate an internal group identifier of the newly created group to the AF, so that a core network element subsequently performs group management by using the internal group identifier.

In a possible implementation, a generation policy is preconfigured in the UDM. The UDM generates the internal group identifier based on the generation policy. Optionally, the generation policy may be a preset algorithm. In this way, the UDM calculates the internal group identifier based on the preset algorithm. In another possible implementation, after receiving the first group request, the UDM may further obtain the internal group identifier from another network element. To be specific, the another network element calculates the internal group identifier, and feeds back a calculation result to the UDM. In other words, the UDM may calculate the internal group identifier, or may directly obtain the calculated internal group identifier from the another network element. A manner of obtaining the internal group identifier by the UDM is not limited in this embodiment of this application.

For example, the UDM calculates an internal group identifier corresponding to a newly created WeChat group.

S506: The UDM determines second identifiers of the one or more group members based on the first identifiers of the one or more group members.

S507: The UDM sends the second identifiers of the one or more group members to the NEF.

S507 is an optional step.

S508: The UDM associates the internal group identifier, the external group identifier, and the first group information.

For example, in this embodiment of this application, the internal group identifier, the external group identifier, and the first group information may be associated in the following format: {an internal group identifier 1 of a group 1, an external group identifier A of the group 1, a DNN 1 of the group 1, S-NSSAI 1 of the group 1, and a session type 1 corresponding to the group 1, and the group 1 include a terminal 1 (a first identifier is xx) and a terminal 2 (a first identifier is yy)}; or for another example, {an internal group identifier 1 of a group 1, an external group identifier A of the group 1, a DNN 1 of the group 1, and S-NSSAI 1 of the group 1, and the group 1 includes a terminal 1 (a first identifier is xx) and a terminal 2 (a first identifier is yy)}. Certainly, the association between the foregoing information may be indicated in another format, for example, indicated in a table format. This is not limited in this embodiment of this application.

S509: The UDM sends a group response to the AF.

Correspondingly, the AF receives the group response from the UDM.

The group response is used to indicate that the group is successfully created. This means that the UDM has associated the internal group identifier, the external group identifier, and the first group information.

In a possible implementation, the UDM first sends the group response to the NEF, where the group response carries the internal group identifier newly allocated by the UDM. Then, the NEF sends the group response to the AF. In this way, the NEF can obtain the internal group identifier corresponding to the external group identifier.

S510: The UDM sends a notification message to a PCF.

Correspondingly, the PCF receives the notification message from the UDM.

The notification message carries at least one of the following information: the internal group identifier, the application identifier (APP ID) of the group, a second identifier of a group member, the data network identifier, the slice information, or the session type.

S511: The PCF generates a URSP based on the notification message.

The URSP includes at least one of the following information: the internal group identifier, the application identifier of the group, the data network identifier, the slice information, or the session type.

S512: The PCF separately sends the URSP to the one or more group members.

According to the group management method provided in this embodiment of this application, the first group request may be received from an application function network element. The first group request carries the indication information used to indicate the group service type, the first group information, and the external group identifier. In this way, when the application function network element requests to create the group, a data network element can obtain, based on the first group request, the internal group identifier corresponding to the external group identifier, and associate the internal group identifier, the external group identifier, and the first group information. On the one hand, the operation of creating the group at the application layer by the user is random. According to the group management method provided in this embodiment of this application, the first group information, the external group identifier, and the internal group identifier may be dynamically associated for a dynamic requirement of creating the group. This means that the AF can have a capability of dynamically creating the group. On the other hand, because the group created at the application layer by the user may be indicated by using the internal group identifier that can be identified by a 3GPP network element, the 3GPP network element can subsequently distinguish between different groups based on the internal group identifier, so that the different groups can be correspondingly managed.

Further, in the group management method shown in FIG. 5, after the UDM receives the first group request from the AF, if the group service type of the first group request is creating the group, it indicates that the AF needs to newly create the group, and the UDM directly obtains the internal group identifier corresponding to the newly created group, to ensure that the core network element can subsequently identify different groups based on the internal group identifier. In this implementation, the UDM does not need to execute logic such as determining, and logic implementation complexity of the UDM is reduced.

Figure 6:
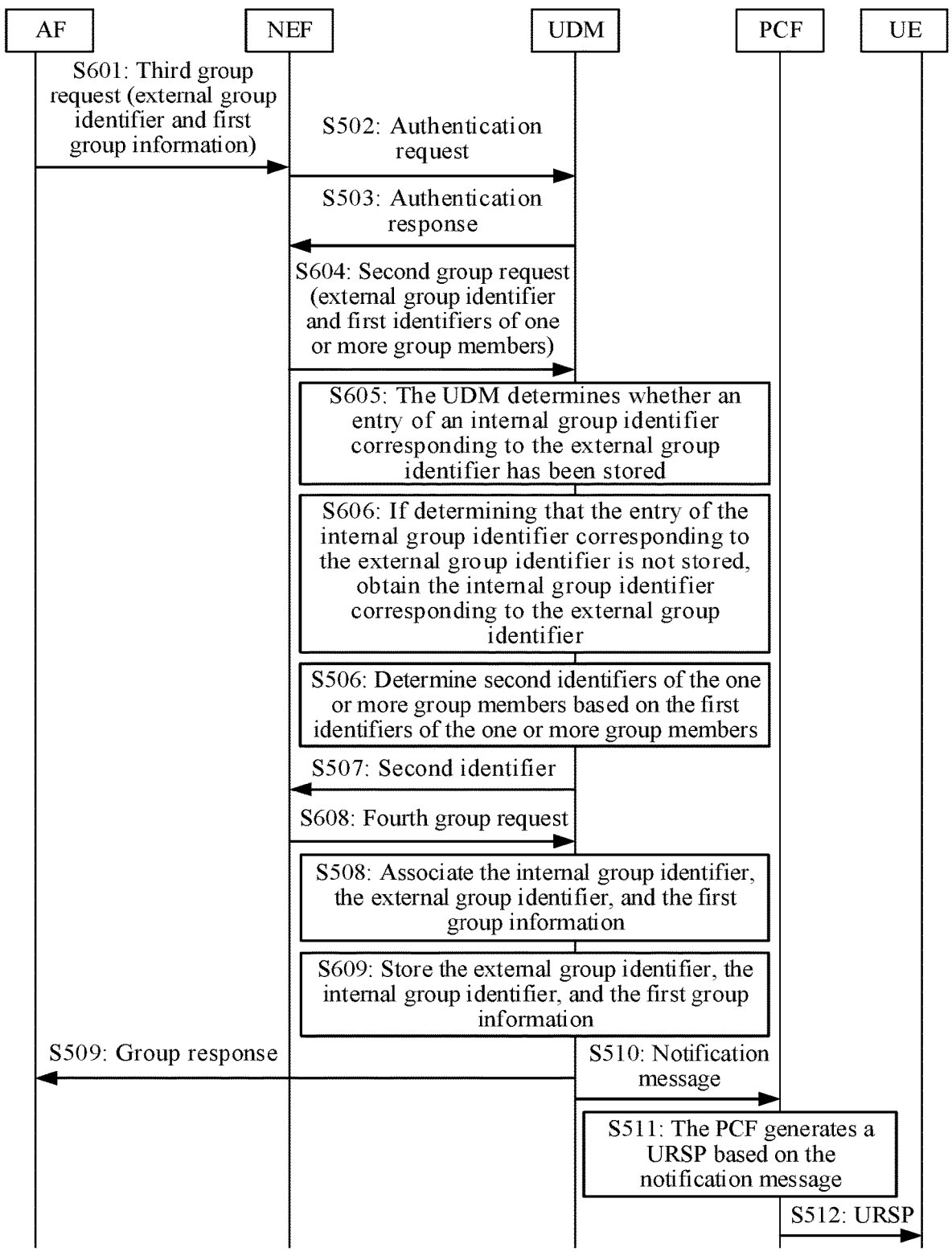
FIG. 6 is a schematic flowchart of a group management method according to an embodiment of this application.

An embodiment of this application further provides a group management method. With reference to FIG. 6, the group dynamic-management method includes the following steps.

S601: An AF sends a third group request to an NEF.

Correspondingly, the NEF receives the third group request from the AF.

The third group request carries an external group identifier and first group information. The first group information includes at least one of the following information: a data network identifier of a group, slice information of a group, a session type corresponding to a group, first identifiers of one or more group members included in a group, or an APP ID of a group.

In a possible implementation, the AF invokes an Nnef_ParameterProvision_Update request service of the NEF to send the third group request to the NEF.

S502: The NEF sends an authentication request to UDM.

Correspondingly, the UDM receives the authentication request from the NEF.

S503: The UDM sends an authentication response to the NEF.

Correspondingly, the NEF receives the authentication response from the UDM.

S503 is an optional step.

S604: The NEF sends a second group request to the UDM.

Correspondingly, the UDM receives the second group request from the NEF.

The second group request includes the external group identifier and the first identifiers of the one or more group members.

Optionally, the second group request further includes at least one of the following information: a DNN, S-NSSAI, the session type, or the application identifier.

S605: The UDM determines whether an entry of an internal group identifier corresponding to the external group identifier has been stored.

S606: If determining that the entry of the internal group identifier corresponding to the external group identifier is not stored, the UDM obtains the internal group identifier corresponding to the external group identifier.

In a possible implementation, a UDR stores one or more external group identifiers and one or more internal group identifiers. If the UDM cannot find, from the UDR, the internal group identifier corresponding to the external group identifier, the UDM obtains the internal group identifier corresponding to the external group identifier.

The UDM may calculate, by using a computing capability of the UDM or a computing capability of another network element, the internal group identifier corresponding to the external group identifier.

Optionally, the UDM sends the internal group identifier corresponding to the external group identifier to the AF.

S506: The UDM determines second identifiers of the one or more group members based on the first identifiers of the one or more group members.

A first identifier includes a GPSI, and a second identifier includes an SUPI. In this way, a 3GPP network element can identify, based on the SUPI, a terminal included in the group.

S507: The UDM sends the second identifiers of the one or more group members to the NEF.

Correspondingly, the NEF receives the second identifiers of the one or more group members from the UDM.

Optionally, if the second group request sent by the NEF to the UDM does not include one or more of the data network identifier of the group, the network slice information of the group, the session type corresponding to the group, or the application identifier in S604, the NEF may further perform the following step S608:

S608: The NEF sends a fourth group request to the UDM.

Correspondingly, the UDM receives the fourth group request from the NEF.

The fourth group request includes one or more of the internal group identifier of the group, the second identifiers of the one or more group members, the data network identifier, the network slice information of the group, the session type corresponding to the group, or the APP ID.

In a possible implementation, the NEF invokes an Nudm_ParameterProvision_Update request service of the UDM to send the third group request to the UDM.

In a possible implementation, if the NEF has sent the data network identifier of the group to the UDM in S604, the NEF no longer sends the data network identifier to the UDM, but sends one or more of the internal group identifier, at least one second identifier, the network slice information of the group, the session type corresponding to the group, or the APP ID to the UDM in step S608. In this way, the NEF can send one or more pieces of information required by the UDM to the UDM by using one or more messages (for example, by using only the second group request, or by using a plurality of messages such as the second group request and the fourth group request).

S508: The UDM associates the internal group identifier, the external group identifier, and the first group information to obtain a correspondence among the internal group identifier, the external group identifier, and the first group information.

S609: The UDM stores the external group identifier, the internal group identifier, and the first group information.

For example, a correspondence among an external group identifier, an internal group identifier, and first group information of a newly created group is stored in the UDR.

S509: The UDM sends a group response to the AF.

In a possible implementation, the UDM first sends the group response to the NEF, where the group response carries the internal group identifier allocated by the UDM. Then, the NEF sends the group response to the AF.

S510: The UDM sends a notification message to a PCF.

Correspondingly, the PCF receives the notification message from the UDM.

S511: The PCF generates a URSP based on the notification message.

S512: The PCF separately sends the URSP to the one or more group members.

Correspondingly, the one or more group members receive the URSP from the PCF.

In this way, the terminal in the group can update the URSP, so that the terminal can determine different routes based on different groups when a LAN service is subsequently transmitted.

It should be noted that an execution sequence of the foregoing steps is not limited in this embodiment of this application, and an execution sequence listed in the accompanying drawings is merely a possible implementation. For example, the UDM may alternatively first perform S506 and S507, and then perform S605. For another example, S510 may be first performed, and then S509 is performed.

In the group management method shown in FIG. 6, after receiving an external group identifier of a group from the AF, the UDM can determine whether an internal group identifier corresponding to the external group identifier has been stored, and further determine a specific identifier used to identify the group, to ensure that a core network element can identify different groups.

An embodiment of this application further provides a group management method. With reference to the subscription procedure shown in FIG. 3 or FIG. 4, with reference to FIG. 7, a method for dynamically creating a group includes the following steps.

S701: An NEF sends a subscription message to UDM.

Correspondingly, the UDM receives the subscription message from the NEF. The subscription message is used to request to subscribe to a correspondence among an external group identifier, an internal group identifier, and first group information. The subscription means that the UDM may actively send the correspondence to the NEF. For example, after the UDM updates the correspondence, for example, when there is a new external group identifier, a new internal group identifier, and new first group information, the UDM may actively send an updated correspondence to the NEF, so that the NEF stores the correspondence.

S701 is an optional step. To be specific, the NEF may not subscribe to the correspondence among the new internal group identifier, the new external group identifier, and the new first group information from the UDM. When the NEF does not subscribe to the foregoing correspondence from the UDM, because the NEF may trigger the UDM to generate the new internal group identifier, after generating the new internal group identifier, the UDM may alternatively actively send the new internal group identifier, the new external group identifier, and the new first group information to the NEF that triggers the generation of the new internal group identifier.

S601: An AF sends a third group request to the NEF.

Correspondingly, the NEF receives the third group request from the AF.

S502: The NEF sends an authentication request to the UDM.

Correspondingly, the UDM receives the authentication request from the NEF.

S502 is an optional step.

S503: The UDM sends an authentication response to the NEF.

Correspondingly, the NEF receives the authentication response from the UDM.

S503 is an optional step.

S704: The NEF determines whether the internal group identifier corresponding to the external group identifier has been stored.

S705: If determining that there is no internal group identifier corresponding to the external group identifier, the NEF sends a second group request to the UDM.

Correspondingly, the UDM receives the second group request from the NEF. The second group request is used to request the UDM to allocate the internal group identifier. For a detailed description of the second group request, refer to the foregoing description. Details are not described herein again.

S706: The UDM obtains the internal group identifier corresponding to the external group identifier.

S506: The UDM determines second identifiers of one or more group members based on first identifiers of the one or more group members.

S507: The UDM sends the second identifiers of the one or more group members to the NEF.

S608: The NEF sends a fourth group request to the UDM.

Correspondingly, the UDM receives the fourth group request from the NEF.

S508: The UDM associates the internal group identifier, the external group identifier, and the first group information to obtain a correspondence among the internal group identifier, the external group identifier, and the first group information.

S509: The UDM sends a group response to the AF.

In a possible implementation, the UDM first sends the group response to the NEF, where the group response carries the internal group identifier newly allocated by the UDM. Then, the NEF sends the group response to the AF.

S510: The UDM sends a notification message to a PCF.

Correspondingly, the PCF receives the notification message from the UDM.

S511: The PCF generates a URSP based on the notification message.

S512: The PCF separately sends the URSP to the one or more group members.

Figure 7:
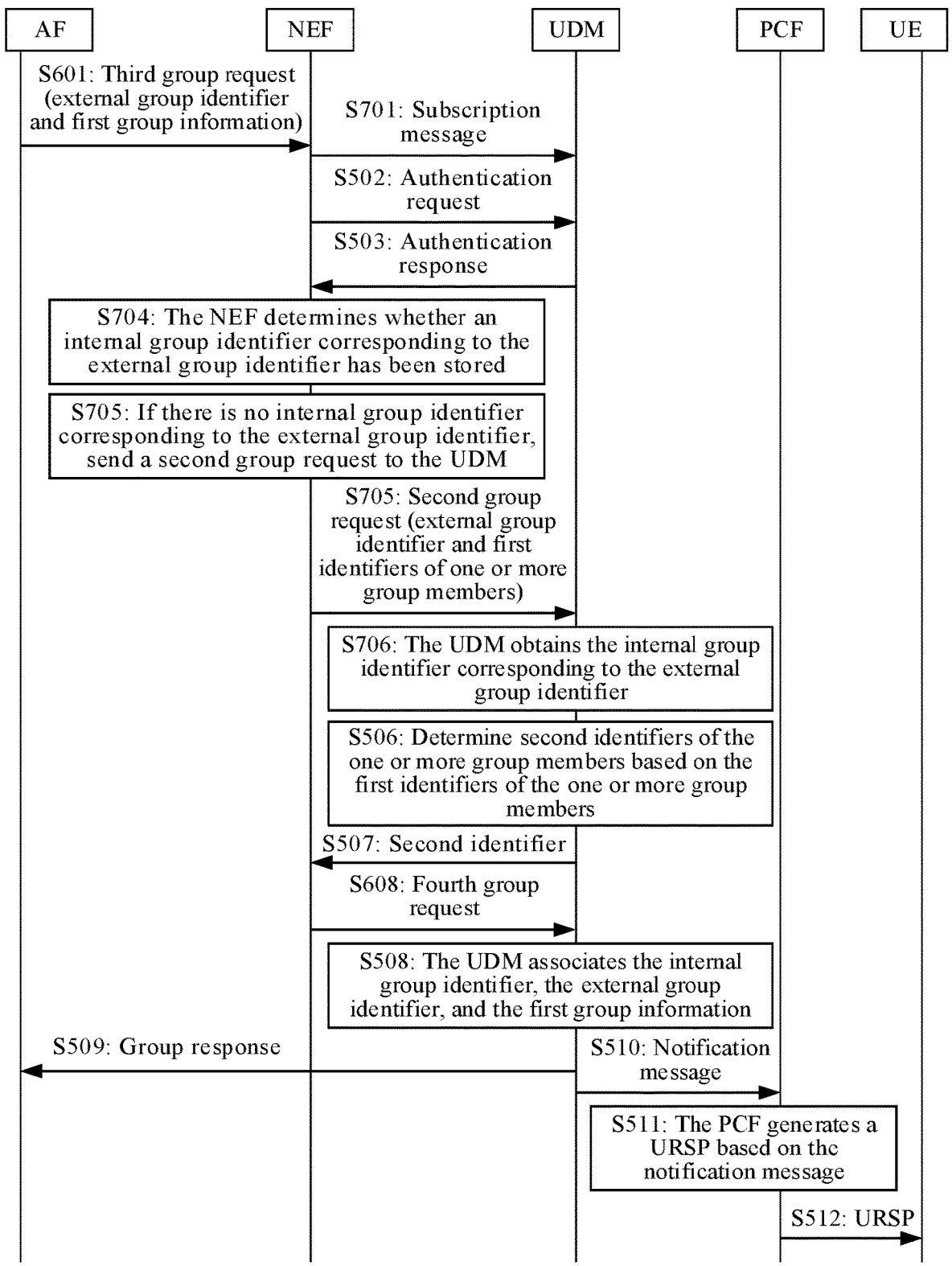
FIG. 7 is a schematic flowchart of a group management method according to an embodiment of this application.

In the group management method shown in FIG. 7, the NEF may subscribe to the correspondence from the UDM. In this way, after the correspondence in the UDM is updated, the UDM notifies the NEF of the external group identifier, the new internal group identifier converted from the external group identifier, and the first group information corresponding to the external group identifier. Subsequently, after the NEF receives an external group identifier of a group from the AF, the NEF may determine whether an internal group identifier corresponding to the external group identifier has been stored.

An embodiment of this application further provides a group management method. With reference to the subscription procedure shown in FIG. 3 or FIG. 4, with reference to FIG. 8A and FIG. 8B, a method for dynamically creating a group includes the following steps.

S601: An AF sends a third group request to an NEF.

Correspondingly, the NEF receives the third group request from the AF.

S502: The NEF sends an authentication request to UDM.

Correspondingly, the UDM receives the authentication request from the NEF.

S502 is an optional step.

S503: The UDM sends an authentication response to the NEF.

Correspondingly, the NEF receives the authentication response from the UDM.

S503 is an optional step.

S804: The NEF obtains internal group identifiers, external group identifiers, and first group information of one or more groups.

In a possible implementation, S804 may be specifically implemented as follows:

S8041: The NEF sends an obtaining request to the UDM.

Correspondingly, the UDM receives the obtaining request from the NEF.

The obtaining request is used by the NEF to obtain the internal group identifiers, the external group identifiers, and the first group information of the one or more groups after the NEF receives the third group request from the AF.

S8042: The UDM sends the internal group identifiers, the external group identifiers, and the first group information of the one or more groups to the NEF.

In a possible implementation, the UDM sends stored internal group identifiers, external group identifiers, and first group information of all groups to the NEF. For example, if the UDM stores internal group identifiers, external group identifiers, and first group information that respectively correspond to groups 1 to 10, the UDM delivers the internal group identifiers, the external group identifiers, and the first group information of the 10 groups to the NEF.

S704: The NEF determines whether there is an internal group identifier corresponding to an external group identifier.

In a possible implementation, the NEF queries, based on the internal group identifiers, the external group identifiers, and the first group information that are of the one or more groups and that are obtained from the UDM, whether there is the internal group identifier corresponding to the external group identifier.

S705: If determining that there is no internal group identifier corresponding to the external group identifier, the NEF sends a second group request to the UDM.

Correspondingly, the UDM receives the second group request from the NEF. The second group request is used to request the UDM to allocate the internal group identifier.

S706: The UDM obtains the internal group identifier corresponding to the external group identifier.

S506: The UDM determines second identifiers of one or more group members based on first identifiers of the one or more group members.

S507: The UDM sends the second identifiers of the one or more group members to the NEF.

S608: The NEF sends a fourth group request to the UDM.

S608 is an optional step.

S508: The UDM associates the internal group identifier, the external group identifier, and the first group information.

S609: The UDM stores the external group identifier, the internal group identifier, and the first group information.

To be specific, the UDM stores a newly generated internal group identifier, an external group identifier corresponding to the internal group identifier, and first group information corresponding to the internal group identifier.

S509: The UDM sends a group response to the AF.

S510: The UDM sends a notification message to a PCF.

Correspondingly, the PCF receives the notification message from the UDM.

S511: The PCF generates a URSP based on the notification message.

S512: The PCF separately sends the URSP to the one or more group members.

Figure 8A:
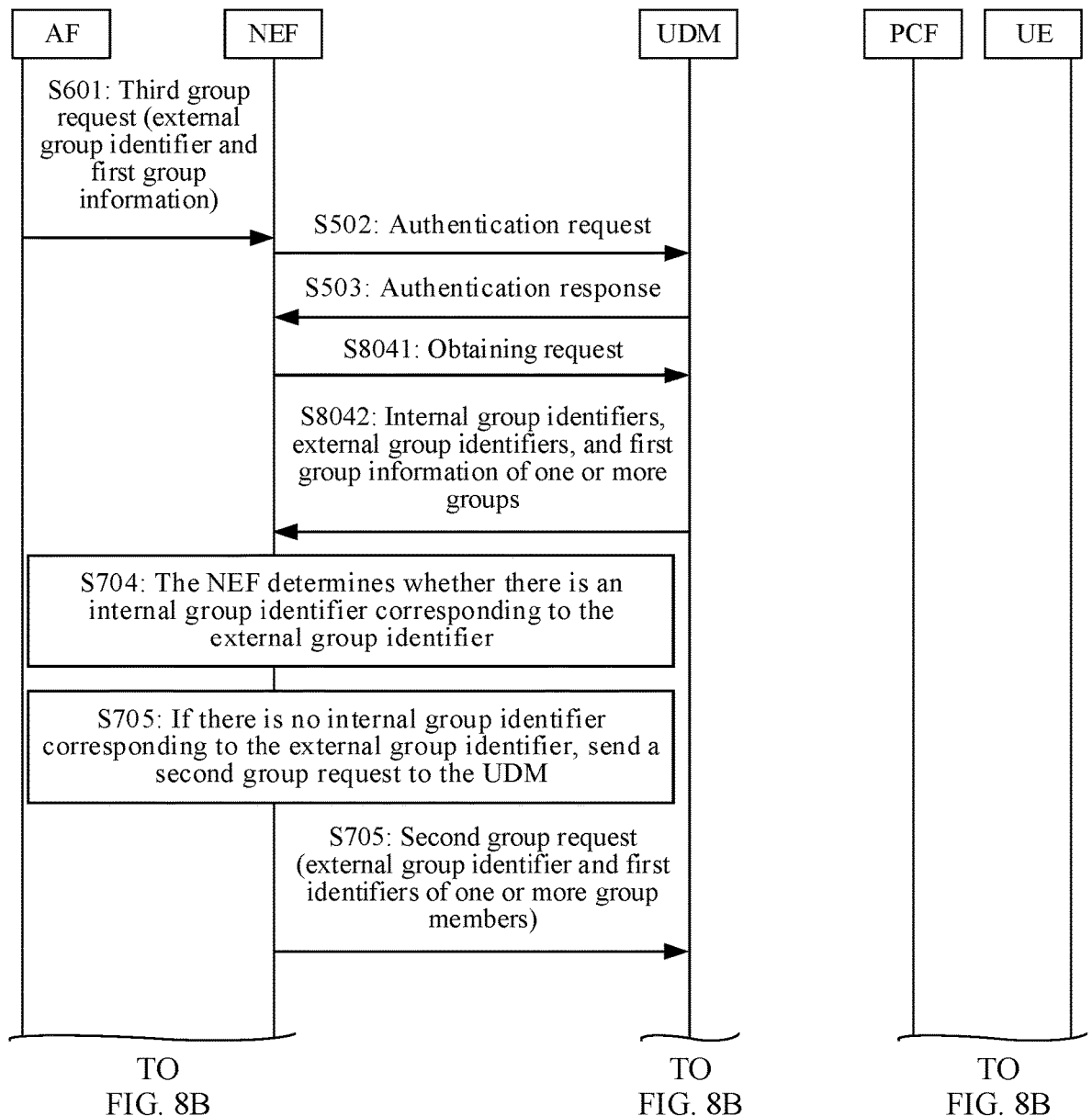
FIG. 8A and FIG. 8B are a schematic flowchart of a group management method according to an embodiment of this application.
Figure 8B:
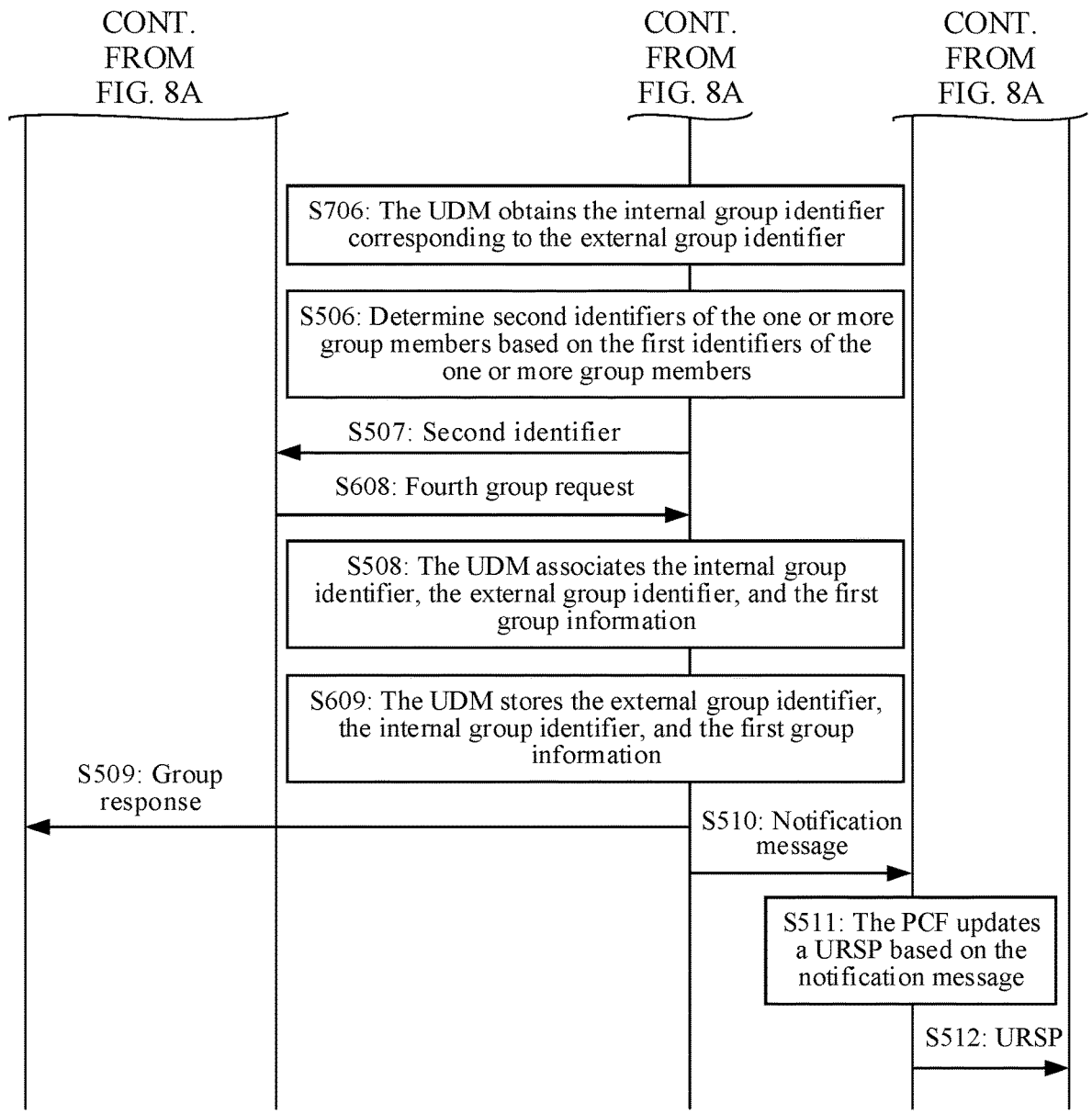

In the group management method shown in FIG. 8A and FIG. 8B, after receiving an external group identifier of a group from the AF, the NEF may apply to the UDM in real time for correspondences among the internal group identifiers, the external group identifiers, and the first group information of the one or more groups, and determine, based on the correspondences, whether an internal group identifier corresponding to the external group identifier has been stored, to ensure that a core network element can subsequently identify different groups based on the internal group identifier.

Figure 9:
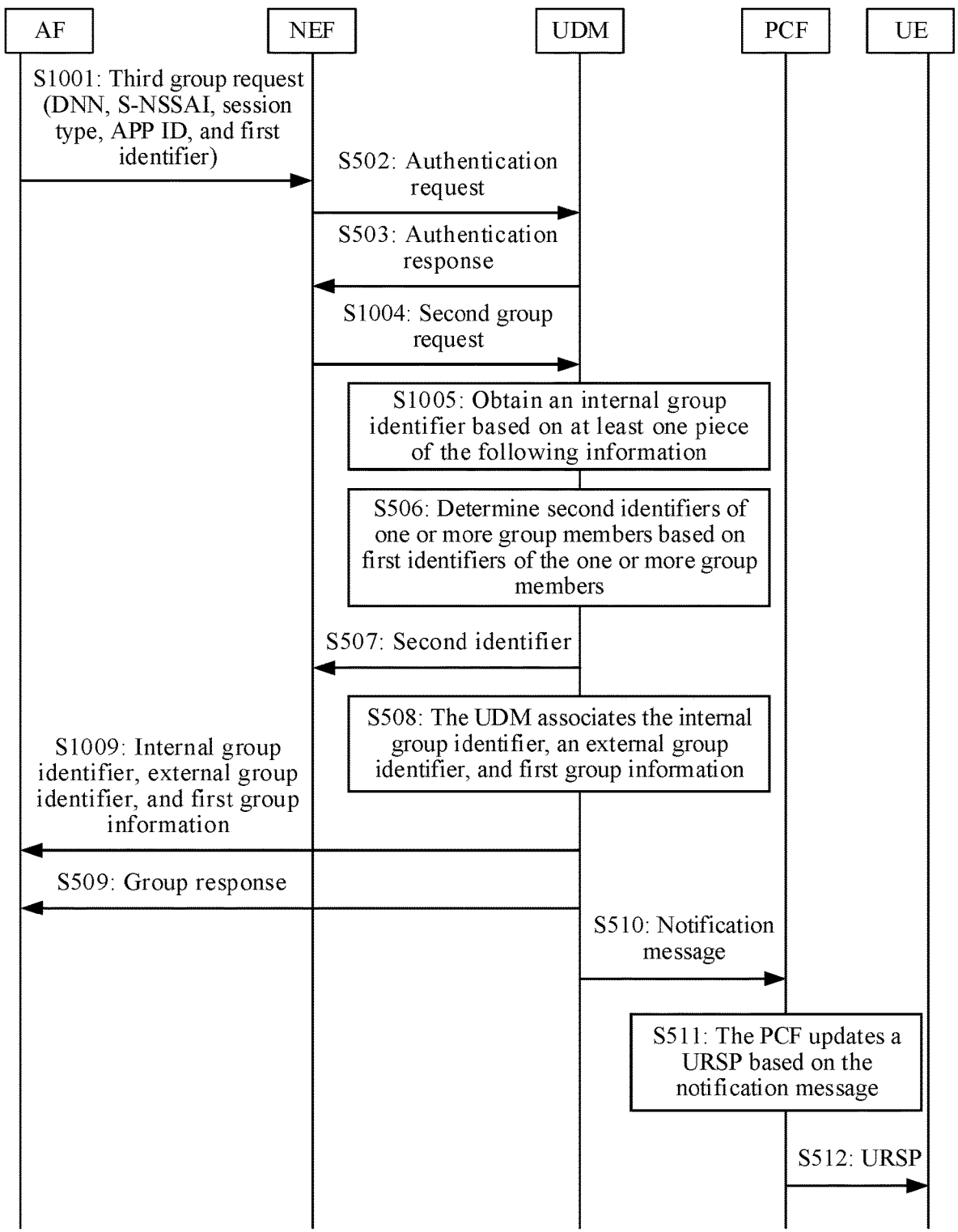
FIG. 9 is a schematic flowchart of a group management method according to an embodiment of this application.

An embodiment of this application further provides a group management method. With reference to FIG. 9, a method for dynamically creating a group includes the following steps.

S1001: An AF sends a third group request to an NEF.

Correspondingly, the NEF receives the third group request from the AF.

In a possible implementation, the third group request may be a 5G LAN Internal Group ID Allocation Request.

The third group request carries at least one of the following: a data network identifier of a group, network slice information of a group, a session type corresponding to a group, first identifiers of one or more group members, or an APP ID.

In a possible implementation, the third group request further carries indication information used to indicate a group service type.

S502: The NEF sends an authentication request to UDM.

Correspondingly, the UDM receives the authentication request from the NEF.

S502 is an optional step.

S503: The UDM sends an authentication response to the NEF.

Correspondingly, the NEF receives the authentication response from the UDM.

S503 is an optional step.

S1004: The NEF sends a second group request to the UDM.

Correspondingly, the UDM receives the second group request from the NEF.

The second group request is used to request to create the group, and the second group request carries the at least one of the following: the data network identifier of the group, the network slice information of the group, the session type corresponding to the group, at least one first identifier, or the APP ID.

For a related description of the second group request, refer to the foregoing description. Details are not described herein again. Optionally, the second group request further carries indication information used to indicate a group service type.

S1005: The UDM obtains an internal group identifier based on at least one of the following information: the data network identifier, the slice information, the session type, an identifier of at least one terminal, or the APP ID.

The UDM may calculate the internal group identifier, or may obtain the internal group identifier from another network element. For example, the UDM allocates the internal group identifier to the group based on the data network identifier and the slice information of the group.

S506: The UDM determines one second identifier of the one or more group members based on the first identifiers of the one or more group members.

S507: The UDM sends the second identifiers of the one or more group members to the NEF.

S508: The UDM associates the internal group identifier, an external group identifier, and first group information.

Optionally, the UDM stores a newly generated internal group identifier, an external group identifier corresponding to the internal group identifier, and first group information corresponding to the internal group identifier.

S1009: The UDM sends the internal group identifier, the external group identifier, and the first group information to the AF.

The UDM delivers, to the NEF, the newly generated internal group identifier, the external group identifier corresponding to the internal group identifier, and the first group information corresponding to the internal group identifier.

Correspondingly, the AF receives the internal group identifier, the external group identifier, and the first group information from the UDM.

S509: The UDM sends a group response to the AF.

In a possible implementation, the group response may be a 5G LAN Internal Group ID Allocation response. The group response is used to indicate that the internal group identifier, the external group identifier, and the first group information have been associated.

In a possible implementation, S1009 and S509 may be implemented through one step. To be specific, the UDM may send the internal group identifier, the external group identifier, and the first group information to the AF by using the group response.

S510: The UDM sends a notification message to a PCF.

Correspondingly, the PCF receives the notification message from the UDM.

S511: The PCF updates a URSP based on the notification message.

S512: The PCF separately sends the URSP to the at least one terminal.

In the group management method shown in FIG. 9, after receiving a second group request of a group from the NEF, the UDM may not execute determining logic, but directly generate an internal group identifier corresponding to the external group identifier. Therefore, logic implementation complexity of the UDM is reduced.

It may be understood that the methods and functions implemented by the devices in the foregoing method embodiments may alternatively be implemented by using a chip that may be used in a device.

The solutions provided in the embodiments of this application are described above mainly from a perspective of interaction between different network elements. It may be understood that to implement the foregoing functions, the devices include corresponding hardware structures and/or software modules for performing the functions. With reference to the units and algorithm steps described in the embodiments disclosed in this application, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of this application.

In the embodiments of this application, the data network element, the interface network element, the application function network element, the terminal, the policy network element, the management network element, and the like may be divided into function units based on the foregoing method examples. For example, each function unit may be obtained through division based on a corresponding function, or two or more functions may be integrated into one processing unit. The foregoing integrated unit may be implemented in a form of hardware, or may be implemented in a form of a software function unit. It should be noted that, in the embodiments of this application, unit division is an example, and is merely logical function division. In actual implementation, another division manner may be used.

Figure 10:
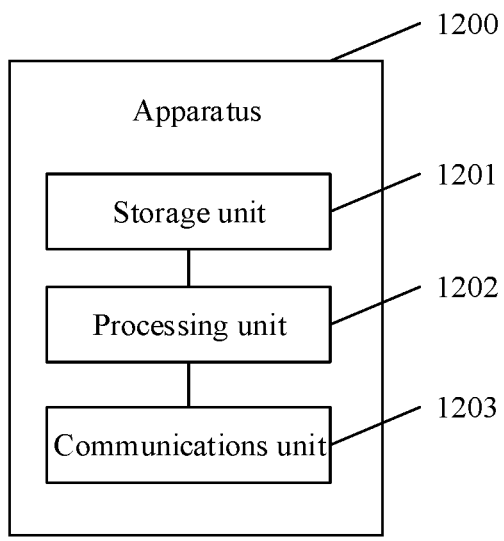
FIG. 10 is a schematic structural diagram of a group management apparatus according to an embodiment of this application.

FIG. 10 is a schematic block diagram of a group management apparatus according to an embodiment of this application. The group management apparatus 1200 may exist in a form of software, or may be hardware, for example, may be a chip that may be used in a hardware device. The group management apparatus 1200 includes a processing unit 1202 and a communications unit 1203.

Figure 5:
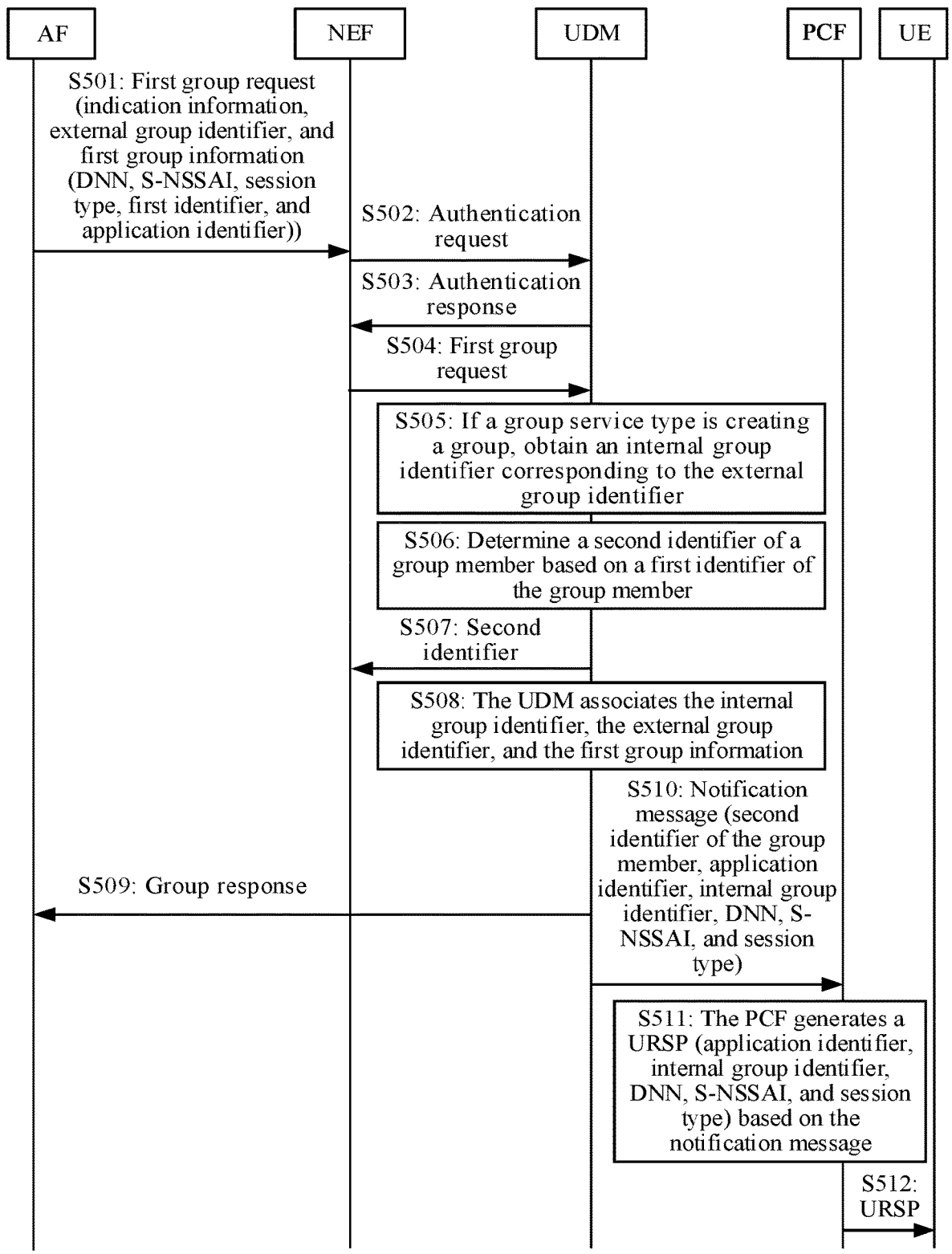
FIG. 5 is a schematic flowchart of a group management method according to an embodiment of this application.

If the group management apparatus 1200 is a data network element, the processing unit 1202 may be configured to support the group management apparatus 1200 in performing S505 and S506 shown in FIG. 5, and/or another process used for the solutions described in this specification. The communications unit 1203 is configured to support communication between the group management apparatus 1200 and another network element (for example, an interface network element), for example, perform S404 and S406 shown in FIG. 4, and/or another step in the solutions described in this specification.

If the group management apparatus 1200 is an interface network element, the processing unit 1202 may be configured to support the group management apparatus 1200 in performing S704 shown in FIG. 7, and/or another process used for the solutions described in this specification. The communications unit 1203 is configured to support communication between the group management apparatus 1200 and another network element (for example, a data network element), for example, perform S701, S502, and S503 shown in FIG. 7, and/or another step in the solutions described in this specification.

If the group management apparatus 1200 is an application function network element, the processing unit 1202 may be configured to support the group management apparatus 1200 in allocating a new external group identifier to a newly created group, and/or another process used for the solutions described in this specification. The communications unit 1203 is configured to support communication between the group management apparatus 1200 and another network element (for example, an interface network element), for example, perform S501 and S509 shown in FIG. 5, and/or another step in the solutions described in this specification.

If the group management apparatus 1200 is a policy network element, the processing unit 1202 may be configured to support the group management apparatus 1200 in performing S511 shown in FIG. 5, and/or another process used for the solutions described in this specification. The communications unit 1203 is configured to support communication between the group management apparatus 1200 and another network element, for example, perform S510 and S512 shown in FIG. 5, and/or another step in the solutions described in this specification.

If the group management apparatus 1200 is a management network element, the processing unit 1202 may be configured to support the group management apparatus 1200 in performing S402 and S403 shown in FIG. 4, and/or another process used for the solutions described in this specification. The communications unit 1203 is configured to support communication between the group management apparatus 1200 and another network element, for example, perform S401 and S404 shown in FIG. 4, and/or another step in the solutions described in this specification.

If the group management apparatus 1200 is a terminal, the processing unit 1202 may be configured to support the group management apparatus 1200 in performing an operation of learning, based on a URSP, of a group in which the terminal is located, and/or another process used for the solutions described in this specification. The communications unit 1203 is configured to support communication between the group management apparatus 1200 and another network element, for example, perform S512 shown in FIG. 5 and/or another step in the solutions described in this specification.

Optionally, the group management apparatus 1200 may further include a storage unit 1201, configured to store program code and data of the group management apparatus 1200. The data may include but is not limited to raw data, intermediate data, or the like.

In a possible manner, the processing unit 1202 may be a processor or a controller, such as a central processing unit (Central Processing Unit, CPU), a general purpose processor, a digital signal processing (Digital Signal Processing, DSP), an application-specific integrated circuit (Application Specific Integrated Circuit, ASIC), a field-programmable gate array (Field-Programmable Gate Array, FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications unit 1203 may be a transceiver, a transceiver circuit, a communications interface, or the like. The storage unit 1201 may be a memory.

Figure 11:
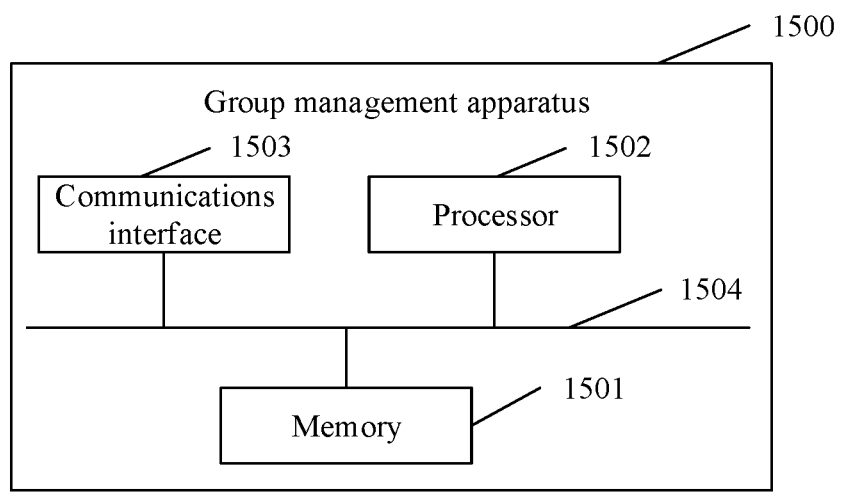
FIG. 11 is a schematic structural diagram of a group management apparatus according to an embodiment of this application.

In a possible manner, when the processing unit 1202 is a processor, the communications unit 1203 is a communications interface, and the storage unit 1201 is a memory, a structure of the group management apparatus in this embodiment of this application may be shown in FIG. 11.

FIG. 11 is a simplified schematic diagram of a possible design structure of a group management apparatus according to an embodiment of this application. The group management apparatus 1500 includes a processor 1502, a communications interface 1503, and a memory 1501. Optionally, the group management apparatus 1500 may further include a bus 1504. The communications interface 1503, the processor 1502, and the memory 1501 may be connected to each other by using the bus 1504. The bus 1504 may be a peripheral component interconnect (Peripheral Component Interconnect, PCI for short) bus, an extended industry standard architecture (Extended Industry Standard Architecture, EISA for short) bus, or the like. The bus 1504 may be classified into an address bus, a data bus, a control bus, and the like. For ease of representation, only one line is used to represent the bus in FIG. 11, but this does not mean that there is only one bus or only one type of bus.

A person of ordinary skill in the art may understand that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (Digital Video Disc, DVD)), a semiconductor medium (for example, a solid-state drive (Solid State Disk, SSD)), or the like.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between apparatuses or units may be implemented in electrical or other forms.

The units described as separate parts may or may not be physically separate, and parts displayed as units may or may not be physical units, may be located at one position, or may be distributed on a plurality of network devices (for example, terminals). Some or all of the units may be selected based on actual requirements to achieve the objectives of the solutions in the embodiments.

In addition, function units in the embodiments of this application may be integrated into one processing unit, or each of the function units may exist independently, or two or more units are integrated into one unit. The foregoing integrated unit may be implemented in a form of hardware, or may be implemented in a form of hardware in addition to a software function unit.

Based on the foregoing descriptions of the implementations, a person skilled in the art may clearly understand that this application may be implemented by software in addition to necessary universal hardware or by hardware only. In most circumstances, the former is a better implementation. Based on such an understanding, the technical solutions in this application essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A group management method, comprising:
   receiving a first group request from an application function network element, wherein the first group request comprises an external group identifier, and first group information and the external group identifier is a group identifier that is not identified by a network element inside a core network;
   in response to determining that the first group request is for creating a group, obtaining an internal group identifier corresponding to the external group identifier, wherein the internal group identifier is a group identifier that is identified by the network element inside the core network; and
   associating the internal group identifier, the external group identifier, and the first group information.

2. The group management method according to claim 1, wherein the first group information comprises first identifiers of one or more group members comprised in the group.

3. The group management method according to claim 1, comprising:
   sending the internal group identifier to an interface network element.

4. The group management method according to claim 2, comprising:
   sending the internal group identifier and the first group information to the one or more group members.

5. A group management method, comprising:
   receiving a third group request from an application function network element, wherein the third group request comprises an external group identifier and first group information, and wherein the external group identifier is a group identifier that is not identified by a network element inside a core network;
   determining whether an entry of an internal group identifier corresponding to the external group identifier has been stored, wherein the internal group identifier is a group identifier that is identified by the network element inside the core network; and
   in response to determining that the entry of the internal group identifier corresponding to the external group identifier has not been stored, sending a second group request to a data network element, wherein the second group request comprises the external group identifier and first identifiers of one or more group members.

6. The group management method according to claim 5, wherein the first group information comprises at least one of the following information: a data network identifier of a group, slice information of the group, a session type corresponding to the group, or the first identifiers of the one or more group members comprised in the group.

7. A group management apparatus, comprising:
at least one processor;
a communications interface coupled to the at least one processor; and
one or more memories coupled to the at least one processor and storing programming instructions for execution by the at least one processor, the programming instructions including instructions to:
receive, through the communications interface, a first group request from an application function network element, wherein the first group request comprises an external group identifier, and first group information, and the external group identifier is a group identifier that is not identified by a network element inside a core network;
in response to determining that the first group request is for creating a group, obtain an internal group identifier corresponding to the external group identifier, wherein the internal group identifier is a group identifier that is identified by the network element inside the core network; and
associate the internal group identifier, the external group identifier, and the first group information.

8. The group management apparatus according to claim 7, wherein the first group information comprises first identifiers of one or more group members comprised in the group.

9. The group management apparatus according to claim 7, wherein the communications interface sends the internal group identifier to an interface network element.

10. The group management apparatus according to claim 7, wherein the communications interface sends the internal group identifier and the first group information to one or more group members.

11. A group management apparatus, comprising:
at least one processor;
a communications interface coupled to the at least one processor; and
one or more memories coupled to the at least one processor and storing programming instructions for execution by the at least one processor, the programming instructions including instructions to:
receive, through the communications interface, a third group request from an application function network element, wherein the third group request comprises an external group identifier and first group information, and wherein the external group identifier is a group identifier that is not identified by a network element inside a core network;
determining whether an entry of an internal group identifier corresponding to the external group identifier has been stored, wherein the internal group identifier is a group identifier that is identified by the network element inside the core network; and
in response to determining that the entry of the internal group identifier corresponding to the external group identifier has not been stored, send, through the communications interface, a second group request to a data network element, wherein the second group request comprises the external group identifier and first identifiers of one or more group members.

12. The group management apparatus according to claim 11, wherein the first group information comprises at least one of the following information: a data network identifier of a group, slice information of the group, a session type corresponding to the group, or the first identifiers of the one or more group members comprised in the group.

* * * * *

UNITED STATES PATENT AND TRADEMARK OFFICE
CERTIFICATE OF CORRECTION

PATENT NO. : 12,063,709 B2
APPLICATION NO. : 17/519741
DATED : August 13, 2024
INVENTOR(S) : Yuan Wang, Runze Zhou and Zhongping Chen It is certified that error appears in the above-identified patent and that said Letters Patent is hereby corrected as shown below:

In the Claims

In Column 28, In Line 22, In Claim 1, delete "information" and insert -- information, --.

Signed and Sealed this
Nineteenth Day of November, 2024

*Katherine Kelly Vidal*

Katherine Kelly Vidal
*Director of the United States Patent and Trademark Office*